United States Patent [19]

Lowe et al.

[11] Patent Number: 5,147,159
[45] Date of Patent: Sep. 15, 1992

[54] CHIP CONTROL INSERT

[75] Inventors: Tony M. Lowe, Royal Oak; Yefim Val, Troy, both of Mich.

[73] Assignee: GTE Valenite Corporation, Troy, Mich.

[21] Appl. No.: 633,725

[22] Filed: Dec. 24, 1990

[51] Int. Cl.⁵ .............................................. B26D 1/00
[52] U.S. Cl. ........................................ 407/114; 407/116
[58] Field of Search ................ 407/114, 113, 115, 116

[56] References Cited

U.S. PATENT DOCUMENTS

| | | | |
|---|---|---|---|
| 4,214,845 | 7/1980 | Mori | 407/114 |
| 4,487,534 | 12/1984 | Reiter | 407/114 |
| 4,597,696 | 7/1986 | Maeda et al. | 407/114 |
| 4,629,371 | 12/1986 | Maeda et al. | 407/114 |
| 4,859,122 | 8/1989 | Patterson et al. | 407/114 |
| 4,880,338 | 11/1989 | Stashko | 407/114 |

*Primary Examiner*—Larry I. Schwartz
*Assistant Examiner*—J. R. Daulton
*Attorney, Agent, or Firm*—Bill C. Panagos

[57] ABSTRACT

Chip control insert having parallel face central aperture diamond configuration, cutting edges extending above a planar recess, annular and discrete corner island locating surfaces, each with radially outward pointed chip breaking projections extending from the annular locating surface toward the center of each cutting edge and from each of the islands toward its respective acute and obtuse corner. Islands at the acute corners are larger than islands at the obtuse corners.

7 Claims, 3 Drawing Sheets

CHIP CONTROL INSERT

BACKGROUND OF THE INVENTION

Many specific forms of chip control cutting inserts are known in the art including cemented carbide cutting inserts having parallel faces, generally diamond configuration, bottom recesses below the cutting edges and chip breaking walls projecting up from the bottom recess.

Special chip breaking effects have been achieved by providing a series of chip deflecting grooves or depressions spaced along the cutting edge such as disclosed in U.S. Pat. No. 4,215,957, 4,273,480 and 4,335,984. Recess grooves with chip breaking projections, particularly for use in turning operations are disclosed in U.S. Pat. No. 3,792,514, wherein a uniform concave groove is provided along each cutting edge in combination with a nose projection in the concave groove isolated from an island on the insert serving for chip breaking and light cutting operations.

Another form of such insert is disclosed in U.S. Pat. No. 4,214,845 including a pair of chip breaking projections at each corner with another projection on the bisector behind the first projections, as well as adjacent the center of each cutting edge. U.S. Pat. No. 3,815,192 discloses a polygonal throw away insert having a plurality of cutting edges on one major surface along the edges of all of the sides thereof and a plurality of projection rows provided on said surface along and spaced from the cutting edges so as to form chip breakers. Adjacent projections along each projection row define chip curling zones therebetween. The most relevant prior art known to applicants is illustrated in four perspective views of alternative commercial inserts identified in applicants' drawings as Prior Art FIGS. 8A-8D, the last of which is taken from U.S. Pat. No. 4,304,509.

BRIEF DESCRIPTION OF THE PRESENT INVENTION

The present cutting insert has been developed for general purpose application with effective satisfactory chip breaking, turning, facing, boring and contouring operations. The insert employs on each face an annular planar seating surface surrounding a central through aperture for locating and securing the insert on a holder, with radial chip breaking extensions projecting into close proximity with the cutting edge at the center of each polygon side.

The preferred embodiment includes polygon corner chip breaking means having ramp walls extending from the bottom surface of the cutting edge periphery in the form of separate radially pointed islands, each having surrounding concave ramp walls.

DETAILED DESCRIPTION OF PREFERRED EMBODIMENT

Figure 1:
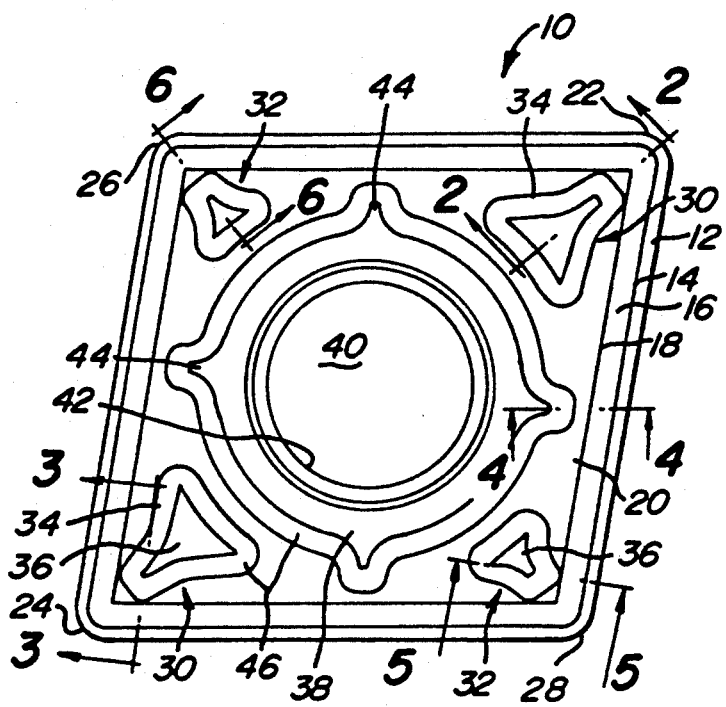
FIG. 1 is a face view of the insert of the present invention.
Figure 2:
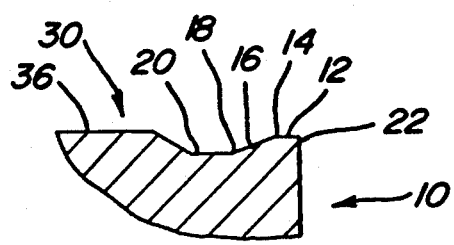
FIGS. 2-6 are respective fragmentary views taken along corresponding section lines shown in FIG. 1.
Figure 3:
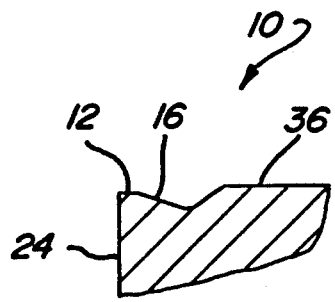
Figure 4:
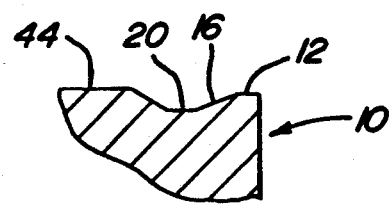
Figure 5:
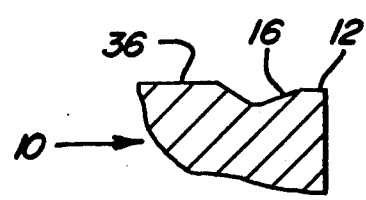
Figure 6:
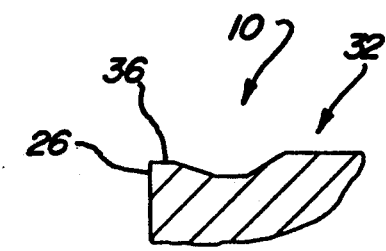
Figure 7:
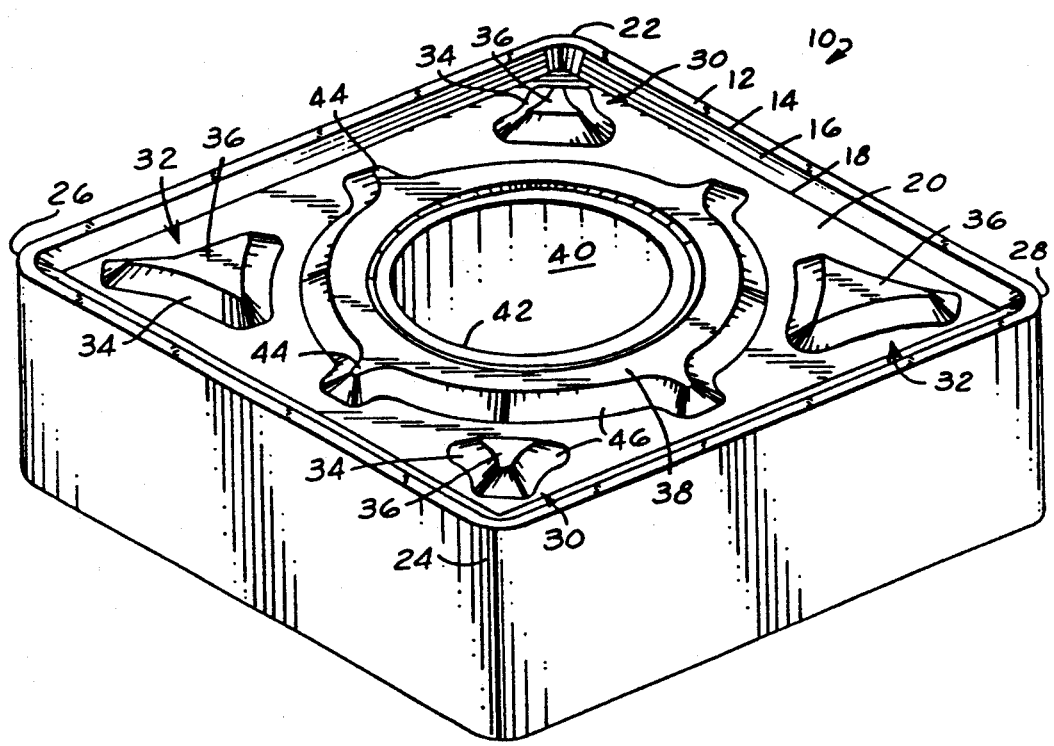
FIG. 7 is an enlarged perspective view of the insert shown in FIG. 1.
Figure 8A:
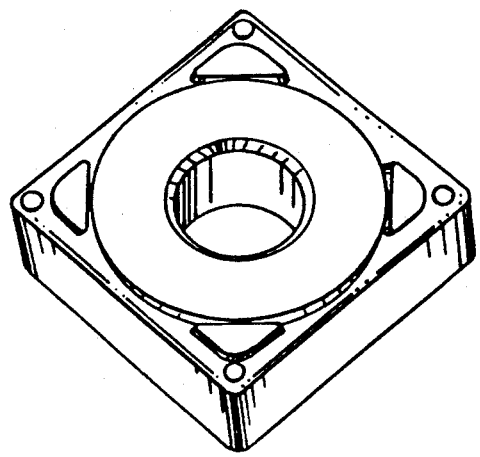
FIG. 8A-D are perspective views of respective relevant prior art inserts.
Figure 8B:
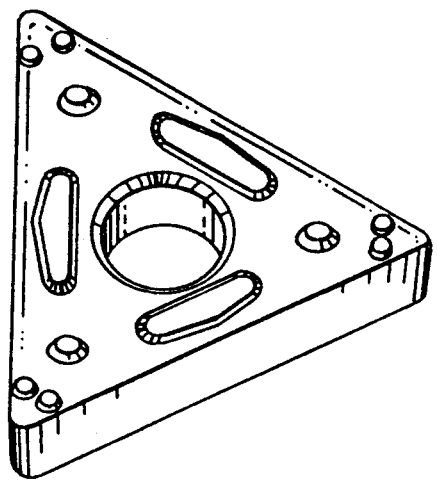
Figure 8C:
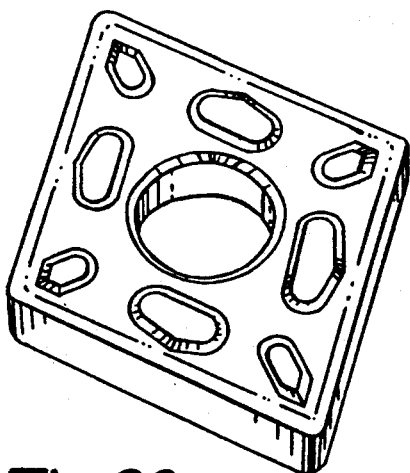
Figure 8D:
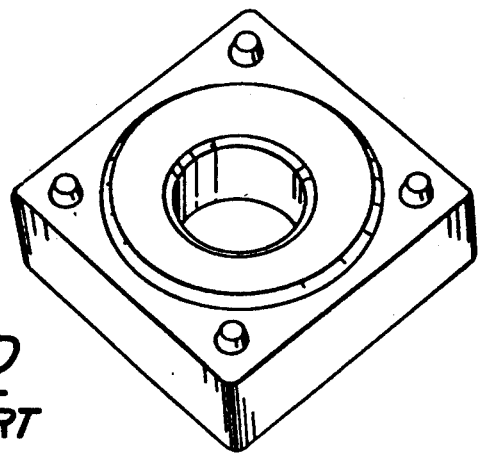

With reference to FIG. 1, insert 10 has a generally diamond exterior configuration with respectively 80° and 100° opposite acute and obtuse angles. It is provided with cutting edge 1 and 12 extending to entry line 14 from which entry surface 16 descends at a 20° angle to bottom line 18 extending around planar bottom surface 20. Bidirectional acute cutting corners 22, 24 have rounded primary cutting edges and bidirectional obtuse cutting corners 26, 28 are used to create chamfers. Relatively larger chip breaking islands 30 are provided at the acute corners and relatively smaller chip breaking islands 32 at the obtuse corners, each of which is flanked by chip breaking concave ramp surfaces 34 having an incident angle of 32° as shown in FIGS. 2, 3, 5 and 6. As also shown in such figures, seating surface 36 of each island extends above cutting land 12; likewise, the principal annular seating surface 38 as illustrated in FIG. 4.

Conventional locating/clamping aperture 40 having cylindrical side wall 42 is provided at the center of the insert within annular seating surface 38. Pointed extensions 44 adjacent the midpoint of each insert cutting edge serve as chip breaking points. Each of extensions 44 and seating surface 38 are surrounded by incident 32° ramp surfaces 46 which serve to curl chips up and break them into short lengths.

Typical dimensions shown in FIGS. 2-6 of the various fragmentary sectional views correspond to a ½" IC chip control insert having ¼" thickness with the same locating and chip breaking pattern on both sides for reversible use with sides extending normal to the faces and with neutral cutting edge land 12. From the dimensions illustrated, it is is apparent that cutting land 12 is typically 0.004" below each island and annular seating surface 36, 38, with a 20° inclined surface 16 leading to groove bottom 20, which is planar and 0.0125" below the island and annular locating surfaces providing a generally open path for coolant access.

In order to accommodate a potential for slight warpage, island surfaces 36 may be provided with a nominal molded surface slightly higher, e.g., 0.002", than annular seating surface 38 in order to assure grind clean up in a common seating plane.

We claim:

1. A diamond shaped polygonal chip control insert comprising side cutting edge periphery, inclined entry surface descending from said periphery to a bottom surface, annular planar seating surface projecting from said bottom surface above said periphery, discrete polygon chip breaking islands with radially outwardly pointed top surfaces in the plane of said seating surface, each of said top surfaces having flanking concave ramp walls ascending from said bottom surface to said top surface, said islands at the obtuse corners being smaller than the islands at the acute corners of the diamond shaped insert, and said annular seating surface having radially outwardly pointed extensions intermediate each polygon side.

2. Chip control insert of claim 1 wherein each of said island ramp walls ascends at approximately 32° from said bottom surface.

3. Chip control insert of claim 1 wherein said annular seating surface including said radial extensions have a surrounding ram wall ascending from said bottom surface to said seating surface.

4. Chip control insert of claim 1 wherein said inclined entry surface descends at approximately 20° from the periphery of said insert.

5. Chip control insert of claim 4 wherein each of said island ramp walls ascends at approximately 32° from said bottom surface.

6. Chip control insert of claim 1 with ½" side wall cutting edges approximately 0.004" below said seating surface.

7. Chip control insert of claim 6 wherein said bottom surface is approximately 0.0125" below said seating surface.

* * * * *